US010951421B2

(12) United States Patent
Rossi

(10) Patent No.: US 10,951,421 B2
(45) Date of Patent: Mar. 16, 2021

(54) ACCESSING HOSTS IN A COMPUTER NETWORK

(71) Applicant: SSH Communications Security OYJ, Helsinki (FI)

(72) Inventor: Markku Rossi, Jarvenpaa (FI)

(73) Assignee: SSH Communications Security OYJ, Helsinki (FI)

(*) Notice: Subject to any disclaimer, the term of this patent is extended or adjusted under 35 U.S.C. 154(b) by 0 days.

(21) Appl. No.: 15/361,690

(22) Filed: Nov. 28, 2016

(65) Prior Publication Data

US 2018/0152299 A1 May 31, 2018

(51) Int. Cl.
| | | |
|---|---|---|
| H04L 9/00 | (2006.01) | |
| H04L 9/32 | (2006.01) | |
| H04L 29/06 | (2006.01) | |
| H04L 9/08 | (2006.01) | |
| H04L 9/14 | (2006.01) | |
| H04L 9/30 | (2006.01) | |

(52) U.S. Cl.
CPC ............ *H04L 9/3263* (2013.01); *H04L 9/006* (2013.01); *H04L 9/0861* (2013.01); *H04L 9/14* (2013.01); *H04L 9/30* (2013.01); *H04L 9/3268* (2013.01); *H04L 63/0281* (2013.01); *H04L 63/06* (2013.01); *H04L 63/0823* (2013.01); *H04L 63/0853* (2013.01); *H04L 63/0884* (2013.01); *H04L 63/1408* (2013.01)

(58) Field of Classification Search
CPC ..... H04L 9/3263; H04L 9/3268; H04L 9/006; H04L 9/30; H04L 9/14; H04L 9/0861
See application file for complete search history.

(56) References Cited

U.S. PATENT DOCUMENTS

| | | | |
|---|---|---|---|
| 6,367,009 B1 | 4/2002 | Davis et al. | |
| 7,506,368 B1 | 3/2009 | Kersey et al. | |
| 8,015,594 B2 | 9/2011 | Salowey et al. | |
| 8,185,933 B1* | 5/2012 | Palmer | G06F 21/31 713/150 |
| 8,214,884 B2 | 7/2012 | Xia et al. | |
| 8,341,718 B2* | 12/2012 | Chow | H04L 63/0807 713/175 |
| 8,402,514 B1 | 3/2013 | Thompson et al. | |
| 8,539,562 B2 | 9/2013 | Bolik et al. | |
| 8,843,750 B1 | 9/2014 | Sokolov | |
| 9,369,282 B2* | 6/2016 | Pal | H04L 9/3228 |
| 2002/0080190 A1 | 6/2002 | Hamann et al. | |
| 2003/0037264 A1 | 2/2003 | Ezaki et al. | |
| 2003/0076961 A1 | 4/2003 | Kim et al. | |
| 2003/0120610 A1 | 6/2003 | Hamber | |

(Continued)

OTHER PUBLICATIONS

Apr. 18, 2018—(EP) European Search Report of EP Application No. 17203652.7.

(Continued)

*Primary Examiner* — Beemnet W Dada
(74) *Attorney, Agent, or Firm* — Banner & Witcoff, Ltd.

(57) ABSTRACT

A security function is provided by an intermediate device located between hosts and devices requesting for access to the hosts in a computerized network. The intermediate device receives a request for access to a host, and obtains at least one authenticator for use in the requested access to the host. The intermediate device then monitors for communications that use the at least one authenticator.

26 Claims, 12 Drawing Sheets

(56) References Cited

U.S. PATENT DOCUMENTS

| | | | |
|---|---|---|---|
| 2004/0268152 | A1 | 12/2004 | Xia et al. |
| 2005/0283608 | A1* | 12/2005 | Halcrow ............ G06Q 20/3674 713/175 |
| 2006/0248347 | A1 | 11/2006 | Smith et al. |
| 2007/0157021 | A1 | 7/2007 | Whitfield |
| 2008/0028206 | A1 | 1/2008 | Sicard et al. |
| 2008/0028235 | A1 | 1/2008 | Smith et al. |
| 2008/0058014 | A1 | 3/2008 | Khan et al. |
| 2008/0060055 | A1* | 3/2008 | Lau ....................... H04L 9/3263 726/3 |
| 2008/0126794 | A1 | 5/2008 | Wang et al. |
| 2009/0037729 | A1 | 2/2009 | Smith et al. |
| 2009/0132813 | A1 | 5/2009 | Schibuk |
| 2013/0259234 | A1 | 10/2013 | Acar et al. |
| 2014/0040139 | A1 | 2/2014 | Brudnicki et al. |
| 2015/0086009 | A1 | 3/2015 | Harjula et al. |
| 2016/0094546 | A1 | 3/2016 | Innes et al. |
| 2016/0183087 | A1* | 6/2016 | Lehtinen ............. H04L 63/0281 726/3 |
| 2016/0261409 | A1 | 9/2016 | French et al. |
| 2018/0167208 | A1 | 6/2018 | Le Saint et al. |

OTHER PUBLICATIONS

Apr. 17, 2018—(EP)—European Search Report of EP Application Serial No. 17203651.9.
Apr. 19, 2018—(EP)—Search Report of EP Application No. 17203654.3.
Jun. 29, 2018 U.S. Non-Final Office Action—U.S. Appl. No. 15/361,672.
Jan. 11, 2019 U.S. Final Office Action—U.S. Appl. No. 15/361,372.
Berzano, Dario, "SSH Autehntiocation Using Brid Credentials," Istituto Nazionale di Fisica Nucleare, Nov. 30, 2012, retrieved from http://web.infn.it/CCR/images/stories/upload_file/note_ccr/infn-12-20_42.pdf <https://protect-us.mimecast.com/s/QWcjCDkwRxi5W7P3FWIO03>, 9 pages.
Kolano, Paul Z., "Mesh: Secure, Lightweight Grid Middleware Using Existing SSH Infrastructure," SACMAT '07, Jun. 20-22, 2007, retrieved from https://pkolano.github.io/papers/sacmat07.pdf, 10 pages.
Sharma, Pranav Kumar, "Short-Lived Certificates as a Mobile Authenitication Method," Master's Thesis, Jun. 26, 2009, Helsinki University of Technology, retrieve from http://nordsecmob.aalto.fi/en/publications/theses_2009/thesis_sharma.pdf <https://protect-us.mimecast.com/s/357LCERKlyi3zwPpFw7nDp>, 79 pages.
May 15, 2019 U.S. Final Office Action—U.S. Appl. No. 15/361,707.
Jun. 3, 2019 U.S. Final Office Action—U.S. Appl. No. 15/361,707.
Jun. 3, 2019 U.S. Non-Final Office Action—U.S. Appl. No. 15/361,672.
Apr. 11, 2019 (EP) Extended European Search Report—App. 18211067.6.
Jan. 9, 2020 U.S. Final Office Action—U.S. Appl. No. 15/361,672.
Dec. 20, 2019 U.S. Non-Final Office Action—U.S. Appl. No. 15/837,271.
Google Scholar, "provisioning virtual smartcard," dated Dec. 16, 2019, pp. 1-2, https://scholar.google.com/scholar?start=10&q=provisioning+virtual+smartcard&hl=en&as_sdt=0,33 (accessed Dec. 16, 2019).
Jan. 15, 2020 (EP) Communication pursuant to Aritcle 94(3) EPC—App. 18211067.6.
NPL Search Terms (Year:2020) (Oct. 16, 2020 U.S. Non-Final Office Action—U.S. Appl. No. 15/837,271).
Oct. 16, 2020 U.S. Non-Final Office Action—U.S. Appl. No. 15/837,271.
May 27, 2020 U.S. Final Office Action—U.S. Appl. No. 15/837,271.
Jun. 1, 2020 U.S. Notice of Allowance—U.S. Appl. No. 15/361,672.

* cited by examiner

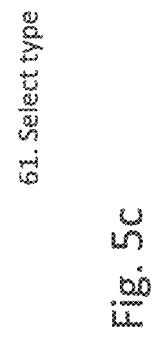
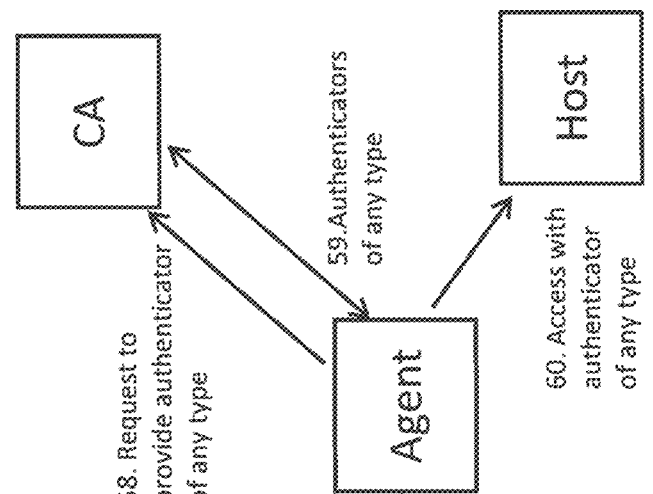
Fig. 5c
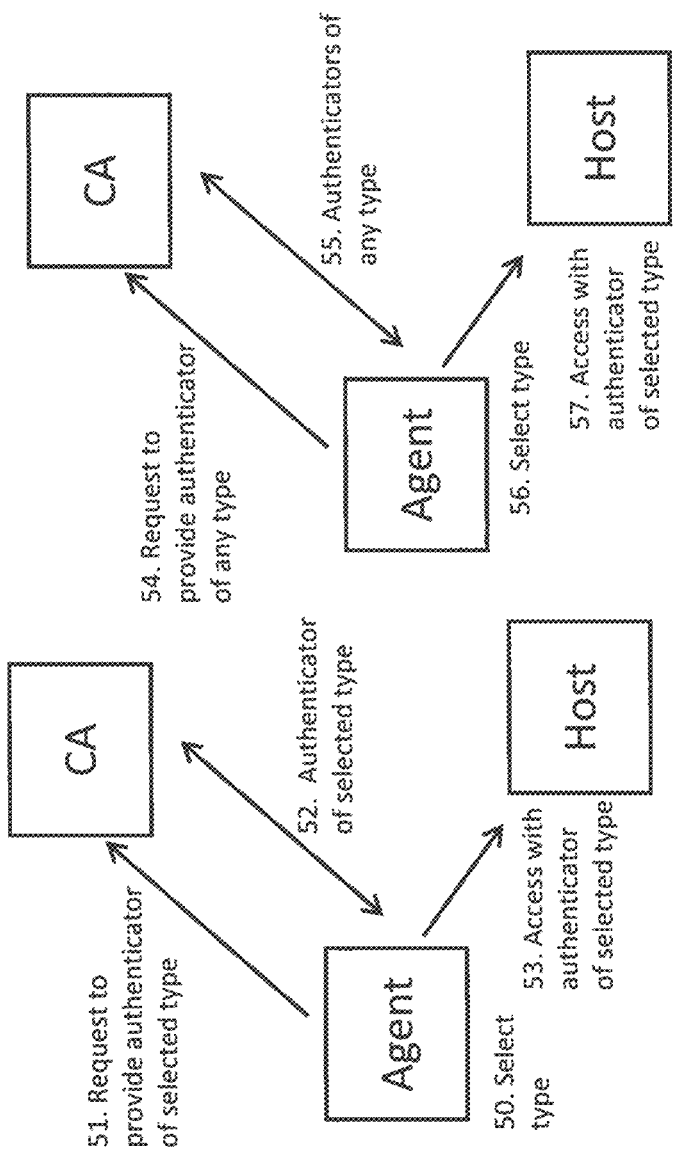
Fig. 5b
Fig. 5a

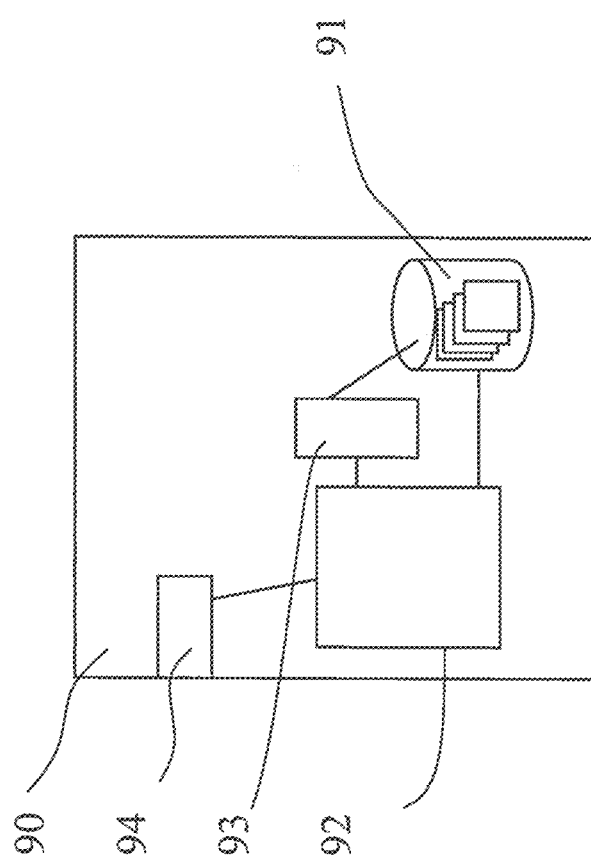

ACCESSING HOSTS IN A COMPUTER NETWORK

FIELD OF THE INVENTION

This disclosure relates to access to hosts in a computerized network. More specific aspects relate to monitoring communications with hosts and use of authenticators for the access and communications.

BACKGROUND

A computerized network system typically comprises various computing devices and other equipment enabling communication of data between the devices. Physical computing devices are often called hosts. A host may also be a virtual computing device or a container such as a Linux™ container or equivalent within a physical computing device. Each host may comprise or be associated with one or more user accounts, processes, and/or files.

A user can access a host by means of a user device configured for communication in the computerized network system. A host to be accessed is sometimes referred to as a target host. Users may wish to access hosts in a computerized network for various reasons. For example, hosts can provide a wide variety of services and/or store files or other content users may wish to use. Various arrangements for accessing hosts and other entities in a computerized network system can be configured. Non-limiting examples of these include web-based access, security protocol (e.g. secure shell protocol; SSH) based access, file transfer access, remote procedure call access, and/or software upgrade access. Such access may be used by, e.g., end users, automation, and/or by system administrators.

Data communications, access to hosts, user devices and hosts itself can be vulnerable to attacks by unauthorised parties. Hence security considerations are of importance. For example, organizations such as businesses, governmental or municipal organizations or non-profitable organizations and also individual users typically want to control how their computer systems and data stored therein can be accessed and used.

Various solutions for enhancing data security have been suggested. Some of these are based on use of keys. Keys can be used e.g. for encryption of data communicated between devices and/or encryption of stored data. In addition to cryptography, keys are also used for authentication and authorisation functions, digital signatures and so on. Public and secret keys are used. In public key cryptography, or asymmetric cryptography, a pair of public and private keys is used. The public keys may be disseminated widely whereas the private keys are known only to the owner. This accomplishes the authentication (the public key is used to verify that a holder of the paired private key sent the message) and encryption (only the holder of the paired private key can decrypt the message encrypted with the public key). Another security feature is based on use of certificates used to verify or sign keys. A public key certificate can be used to prove the ownership of a public key. A public key certificate is an electronic document, also known as a digital certificate or identity certificate that includes information about the key, information about the identity of the proprietor of the key, and the digital signature of an entity that has verified that the contents of the certificate are correct. The principle is that if the signature is valid, and the person examining the certificate trusts the signer, then that key can be used to securely communicate with its proprietor. Certificates are considered to provide a good defence in preventing an attacker from impersonating a secure website or other server. Certificates are signed by a certificate authority (CA). The CA can be a trusted party or organisation, e.g., a company that charges customers to issue certificates for them. In a web of trust scheme, the signer can be an owner of a key (a self-signed certificate) or other users ("endorsements") whom the person examining the certificate might know and trust.

Keys and certificates are widely used in computerized network systems for enhancing security. Such widespread use can cause problems. For example, a large number of certificates may be in use in any organisation and/or computerised system. Some of these can be in use in the system without anyone realising/without being accounted for. A particular problem can be caused by certificates that have no set expiry, or expire only after a long period of time. Also, certificates may have been issued to users whose access rights have expired, for example ex-employees or sub-contractors. As long as the certificate exists and has not been revoked, it can be used for access to a host. Furthermore, once a connection is established in response to a request for access to a host it may stay open for a long period of time, even indefinitely.

It is possible to scan a system to weed out any old and/or unused and/or otherwise suspect certificates and/or keys and old open connections. However, a scan can take quite a while and/or may also miss something that should not be in use.

Managing certificates, other authenticators and security features and old connections can become even more problematic in virtualised environments and cloud computing where a number of physical entities may provide a user with an access to a host. For example, a service may be provided for a user accessing the service in different sessions by different physical entities or hosts in the cloud, resulting a certificates and/or keys being used in a number of locations. Further, different types of hosts may require use of different authenticators for the access. User may not be aware of this, for example whether he/she is trying to access a legacy or cloud type host. This can set considerable challenges for managing the use of keys and certificates, and access to hosts in general.

It is noted that the above discussed issues are not limited to any particular communication protocol and data processing apparatus but may occur in any computerised system where authenticators such as certificates are used to enhance data security.

Embodiments of the invention aim to address one or several of the above issues.

SUMMARY

In accordance with an aspect there is provided an intermediate device for providing a security function in a computerized network between hosts and devices capable of accessing the hosts, the intermediate device comprising: interface apparatus configured for communications with hosts and devices requesting access to the hosts such that the intermediate device provides an intermediate node between the hosts and the devices, and control apparatus connected to the interface apparatus and comprising at least one a processor, and a memory storing instructions that, when executed, cause the control apparatus to process a request from a device for access to a host, obtain, from a security device, at least one authenticator for use in the requested access, and monitor communications that use the at least one authenticator.

According to another aspect there is provided a method for providing a security function by an intermediate device located between hosts and devices requesting for access to the hosts in a computerized network, the method comprising: receiving from a device at the intermediate device a request for access to a host, obtaining by the intermediate device at least one authenticator for use in the requested access to the host, and monitoring by the intermediate device communications that use the at least one authenticator.

According to yet another aspect there is provided a non-transitory computer readable media comprising program code for causing a processor to perform instructions for a security method implemented at an intermediate device located between hosts and devices requesting for access to the hosts in a computerized network, the security method performed by the intermediate device comprising: receiving from a device a request for access to a host, obtaining at least one authenticator for use in the requested access to the host, and monitoring communications that use the at least one authenticator.

According to a more specific form the authenticator may comprise a certificate. The control apparatus can be configured to request for the certificate from a certificate authority (CA).

A control apparatus of an intermediate device may comprise an authentication component configured to authenticate the request for access to the host prior to sending a request for an authenticator to the security device.

An intermediate device may be further configured to: receive and authenticate the request for access from the device, wherein the request for access contains at least one second authenticator for use in the authentication of the request for access; request and receive the at least one authenticator from the security device after the request for access has been authenticated based on the at least one second authenticator; and process communications between the device and the host based on the at least one authenticator from the security device.

Communications may be monitored based on at least one condition for the use of the at least one authenticator. At least one condition for the use of the at least one authenticator may be set independently of the security device. The control apparatus may be configured to receive information of at least one condition for the use of the at least one authenticator from the security device.

The condition can comprise a validity period of an authenticator. The validity period can be set to be shorter than a validity period of a second authenticator for authentication of the request for access received from the device.

Expiry of a validity period of the authenticator can be monitored, the validity period being shorter than at least one of: a validity period of the authenticator received from the security device, a validity period of a second authenticator used for authentication of the request for access received from the device, maximum session length defined in association with the host, and maximum session length defined in association with the device.

A control apparatus may also be configured to monitor at least one of usage of the at least one authenticator, user of the at least one authenticator, behavior of the device, events associated with the host, events associated with one or more communication sessions established based on the at least one authenticator, and how and/or when the at least one authenticator is used.

A control apparatus may be further configured to take a control action based on the monitoring. The control apparatus can be configured to at least one of: request for a new authenticator for the device, trigger an alert, prevent access by the device to the host, prevent access by the device to at least one other host, limit access by the device to the host or to at least one other host, and control the length of a communication session established based on the at least one authenticator.

The disclosed functions and features can be provided in an intermediate device configured to intercept encrypted communications between the device and hosts and/or to provide at least some functionalities of a data auditing system.

Certain more detailed aspects are evident from the detailed description.

SUMMARY OF DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures

FIGS. 5a, 5b and 5c shows examples of use of an agent,

FIG. 12 shows data processing apparatus.

DETAILED DESCRIPTION

Figure 1:
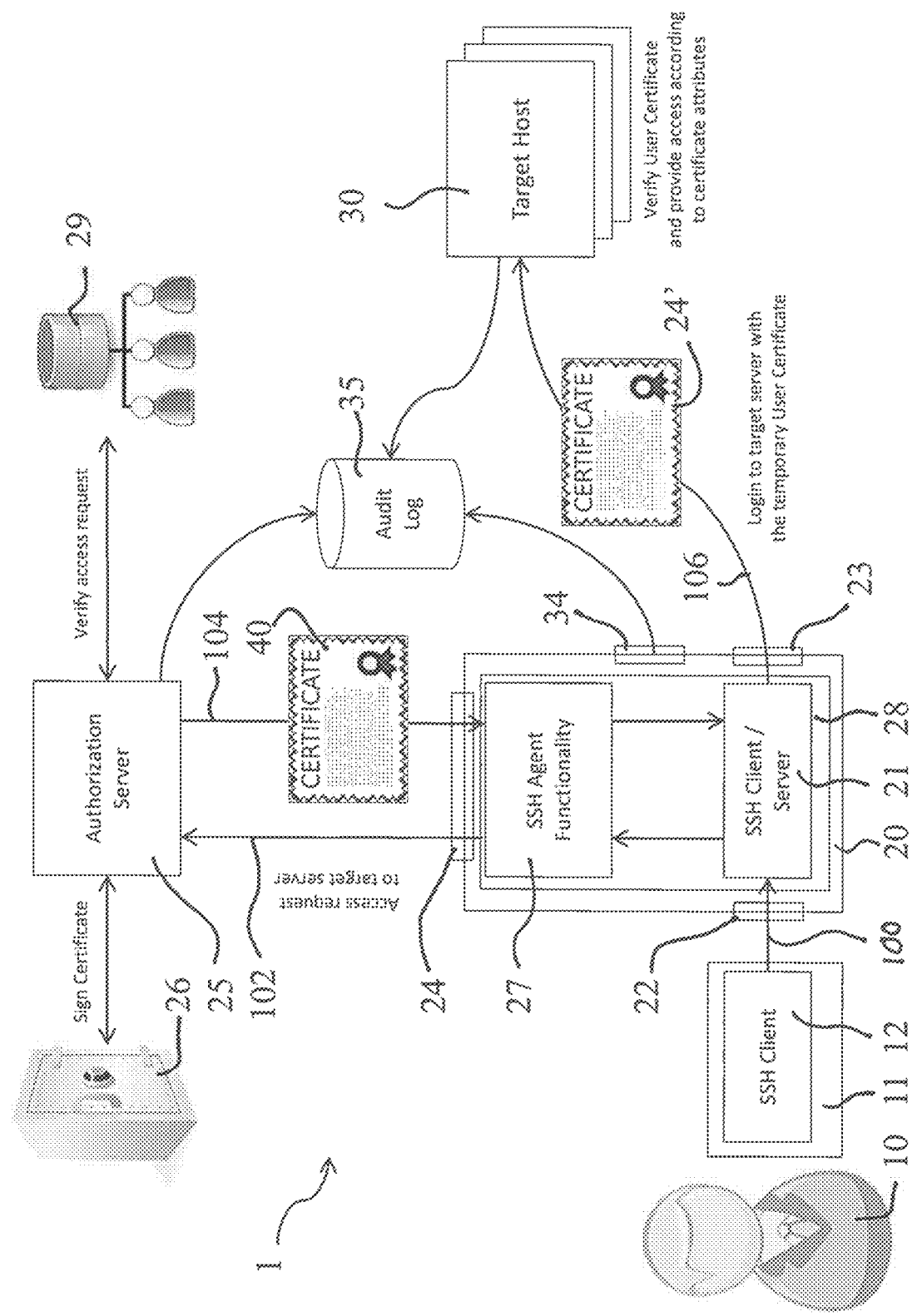
FIG. 1 illustrates an example of a network where an aspect of the invention can be embodied.

FIG. 1 shows an example of a computerized network system 1 where some of the herein described aspects may be embodied. More particularly, FIG. 1 shows a specific example of an aspect where an intermediate device 20 provides a security function between hosts and devices capable of accessing the hosts. In this particular example a user 10 accesses, using his/hers user device 11, a host 30. The access path via the network is indicated by arrows 100 and 106 from the user device 11 to the host 30.

The network can comprise, for example, an Intranet of an enterprise or another organization, or a broader network such as the Internet. The network can be e.g. an IPv4 (Internet Protocol version 4) or IPv6 (Internet Protocol version 6) based network. The network system may comprise one or more data networks.

The intermediate device of this aspect comprises interface apparatus 22, 23 configured for communications with the hosts and devices requesting access to the hosts such that the intermediate device provides an intermediate node between the hosts and the devices. The intermediate device further comprises control apparatus 28 connected to the interface apparatus and comprising at least one a processor, and a memory storing instructions that, when executed, cause the control apparatus to perform tasks described herein. The processor can be configured to process a request 100 from the device 11 for access to the host 30. After receipt of the request, the processor can obtain an authenticator 40 for use in the requested access. This may be provided by sending a request 102 to an external security device 25 and receiving an authenticator 40 therefrom in message 104. Alternatively, the intermediate device may be provided with an integrated security device, and an authenticator may be requested therefrom. The intermediate device 20 is further configured to monitor communications that use the obtained authenticator. The intermediate device 20 may also be configured to control communications that have been established based on authenticators from the security device.

The authenticator may comprise a certificate, the control apparatus being configured to request for the certificate from a security device providing a certificate authority (CA). The CA may be an external entity or integrated with the intermediate apparatus.

In this description the term host, or target host, refers to an entity which can be accessed by the device 11. The accessed host 30 can provide a service for the user via the network. A host may be provided, e.g., by a server or another physical data processing entity. A host may also be provided in virtual environment based on cloud computing.

Hosts can be given a logical role. That is, the hosts may not necessarily need to be identified by specific names and identities but can be assigned into logical roles. For example, logical roles such as web servers, database servers (e.g. Oracle™ database servers), etc., can be assigned to hosts. Target hosts can be configured with static role-based templates. The host configuration and application software can be provisioned with an automated system configuration tools. Examples of these include those offered under trade names such as CHEF, PUPPET, ANSIBLE, etc.

A logical role can be provisioned with a configuration tool template. Based on the logical role features such as user principals can be mapped on the system level accounts. The principals are understood as logical privileges in the system. Users can be given a set of principals when they authenticate themselves. These principals can then be used at target hosts to map the users to the target system accounts. For example, on xxx Database Server, the "xxx-admins" principal provides access to the "xxx" system account.

The user device 11 may comprises a mobile device connected to the network over air interface. At least a part of the connection can thus be provided over a wireless interface. For example, the user device may be provided wireless access to the communication network. A wireless connection to the network can be provided via a base station based on e.g., wireless local area network (WLAN), GSM/EDGE/HSPA, 3G, 4G, 5G, or WiMAX standards, and/or optical and near-field networks, or any future development of wireless standards. The user device may also comprise a computer device that is connected to the network via fixed line connection.

The access to the communication network can be secured based on an appropriate security protocol. The control apparatus 20 may comprise an authentication component configured to authenticate the request for access 100 to the host 30 prior to sending a request for an authenticator to a security device. For example, secure shell (SSH) protocol, secure sockets layer (SSL) protocol, transport layer security (TLS) protocol or the like may be used. In FIG. 1 example the user device 11 is shown to comprise a SSH client 12 adapted for communication with another SSH entity 21 provided in a network element.

A network system and communications therein can be constantly monitored to protect the system from attacks by malicious users and data leaks and other unauthorised data communications and/or to prevent data loss. An intermediate apparatus may be used to provide an intermediate monitoring function in the network for monitoring communications between devices and hosts. The monitoring can also be applied on encrypted communications. An intermediate apparatus may also be configured to intervene communications. Intervention can be provided for various reasons. Intervention can be used to create data e.g. for defensive, analytical and audit purposes and/or for preventing loss of data. For example, organizations such as businesses, governmental or municipal organizations or non-profitable organizations may wish to audit and/or otherwise monitor use and access to their internal computer systems. A way to provide this is to capture and analyse data communicated between two parties by an appropriate intermediate node.

At least a part of data flowing through the intermediate device can be encrypted. In such case the intermediate data processing device can be configured to provide a man-in-the-middle (MITM) type operation on the encrypted data flowing there through to obtain the plaintext of the data. The MITM operation involves decryption of encrypted data. This can be based on knowledge of the private key or other encryption credential used in the encryption. The data capturing intermediate node is operated and maintained by a trusted party, typically the owner of the network, and can thus be provided with the necessary keys and/or other security information required for the decryption. It is noted that this is only an example and that the shown architecture and/or MITM type operation is not necessary in all scenarios. For example, the monitored passing data flow can also be plaintext, for example plaintext transport control protocol (TCP) or user datagram protocol (UDP) communications. Instead of the shown arrangement other network arrangements and modes are also possible. For example, interfaces can be in a bastion mode.

A data capture device such as a crypto auditor can be provided as a standalone hardware component or embedded in another element, e.g. in a firewall or the like component. The data capture device can also be provided as a virtual machine set up in cloud computing environment. A firewall may contain one or more protocol proxies, such as an secure shell (SSH) proxy, remote desktop protocol (RDP) proxy, virtual network computing (VNC) proxy, file transfer protocol/secure (FTP/S; FTP over secure sockets layer (SSL), transport layer security (TLS) protocols) proxy, or HTTP/S (HTTP over SSL/TLS) proxy. A proxy may also implement more than one protocol. Each proxy can contain a man-in-the-middle component for performing man-in-the-middle operation, or key escrow or other suitable method, for obtaining access to the plaintext of the session.

In FIG. 1 communication sessions between the user device 11 and the target host 30 flow through an intermediate data capturing apparatus 20. The intermediate node 20 hosts a data capturing entity configured to monitor traffic going there through and capture data for e.g. data audit purposes. The captured data may be processed and/or stored at the intermediate node. According to a possibility at least a part of captured data is forwarded to another entity for storage and/or processing. This is denoted in FIG. 1 by an audit log entity 35. The audit log entity may correspond with the intermediate apparatus via interface 34. Hence the apparatus can be called a crypto graphical auditor, or in short crypto auditor. Auditing data traffic in the system can be desired for various reasons. For example, a company policy may force all data traffic, or traffic from particular hosts to be audited. It may even be necessary to set up a key manager to work through the auditor nodes for network topology reasons. An auditor node may only transparently support password and keyboard interactive authentications. All challenges and responses can be sent through an unencrypted channel in clear text and therefore can be relayed transparently through the auditor node. If encryption of the content is used, the auditor node would need to be provided with a clear text password. A capturer component of an auditing system can be classified to be a high security level device and thus this operation can be allowed through a policy.

It is noted that the manner how the captured data is processed as such, e.g., decrypted and analysed, for audit purposes is of lesser relevance in view of understanding the herein disclosed principles. What is relevant is that the user device 11 can access the host 30 via the intermediate data capturing apparatus 20 and that data, including request for access and communications after the access has been granted, communicated between the devices is routed via the intermediate apparatus.

Figure 2:
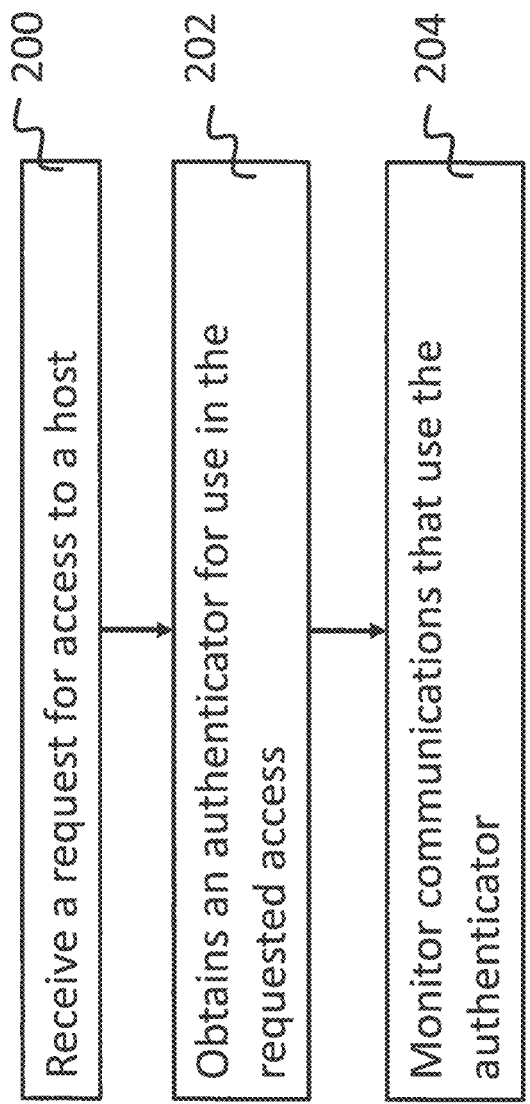
FIG. 2 shows a flowchart in accordance with an embodiment.

Flowchart of FIG. 2 illustrates operation in accordance with an aspect. At 200 an intermediate device receives from a device a request for access to a host. The intermediate device then obtains at 202 an authenticator for use in the requested access to the host. At 204 the intermediate device monitors communications that use the authenticator.

The authenticator may be obtained from an external security device, or an integrated security device. Obtaining an authenticator may comprise sending a request for an authenticator from the intermediate device to a security device, for example a certificate authority (CA). The monitoring may comprise monitoring communications that use the certificate or other authenticator. The use shall be understood to refer to use of the certificate for the access and, depending on the application, use the authenticator for other purposes during established communication session or sessions.

A request for access to the host may be authenticated based on at least one second authenticator used for communications between the requesting device and the intermediate device prior to sending the request for the authenticator.

The monitoring may be based on at least one condition on the use of the authenticator. At least one condition on the use of the authenticator may be set by the intermediate device independently of the security device. It is also possible to receive at the intermediate device information of at least one condition on the use of the authenticator from the security device. According to a specific aspect an authenticator has a validity period that is shorter than a validity period of a second authenticator used for authentication of the request for access received from the device. The validity period of the authenticator may also be set to be shorter than a validity period of the authenticator received from the security device. Also, the validity period of the authenticator may be defined to be shorter that maximum session length defined in association with the host and/or maximum session length defined in association with the device.

The monitoring can comprise monitoring usage of the authenticator. For example, where the authenticator is used, how, the amounts of data transferred, by whom and/or when the authenticator is used can be monitored. The identity of the user of the authenticator (the device and/or the user) can be monitored to ensure that it has not fallen into wrong hands. The host, and any changes in the host may be monitored. Behaviour of the device can also be monitored. For example, it can be detected that there is a pause in the established communications. It can then be determined whether the pause is acceptable, or whether the authenticator shall be revoked and/or communication session terminated.

Various events associated with one or more communication sessions established based on the authenticator may also be monitored. For example, if a user having a communication session established based on an authenticator from a security device has a great number of other communications session, or tries to open more than acceptable number of communication sessions, or if there is an attempt to intervene such a communication session, an appropriate control action may be taken.

An appropriate control action can be taken in response to the monitoring detecting an event triggering need for a control action. The control action may comprise a request for a new authenticator for the device. This may be needed e.g. when there is a change in the established communications session and/or in the host, or after a pause in communications which are then continued. The monitoring may also result triggering an alert. The alert may be for the administrator of the system, the hosts and/or the user accessing the host. The intermediate device may also prevent access by the device to the host and/or prevent access by the device to at least one other host in response to detection of suspicious behaviour or another predefine event such as too long pause, change in the identity of the user or the device, and/or attempts to access a number of hosts. Access to the host or to at least one other host may also be temporarily or permanently limited by the intermediate device, for example by temporarily or permanently preventing use of the authenticator for access to the host(s). The length of communication sessions established based on the authenticator may also be controlled.

FIG. 1 shows a separate security device, and more particularly an authorization server 25. The authorization server can comprise a certificate authority (CA) providing a certificate issuing functionality of the network system. The security device such as a CA can communicate with a system of record 29 to authenticate users and get additional information, for example group information. The security device can further implement policy decisions. A policy decision can include, inter alia, how users are authenticated, how user groups map to principals, and which options and extensions are included in the certificate.

The system of record 29 can provide an authoritative user information registry. The system of record can be arranged to provide an authoritative source of user information and system policy definitions. On customer environments this can be e.g. an Active Directory; a Lightweight Directory Access Protocol (LDAP) directory/OpenLDAP directory holding users and groups (principals). Users can be uniquely identifiable by the system of record. A unique identifier (ID) can be e.g. a LDAP DN (cn=Markku Rossi,cn=users,dc=ssh, dc=com). Other user attributes can also be used to identify a user during the authentication flow. Other examples of IDs include e.g. uid "mrossi", email address, other address information such as telephone number, user account names etc.

Users and user groups can be configured in the system of record. The configuration can have e.g. three levels where a level is for defining active users with their login information (username, password, email address, system account name, etc.) and mapping the users into logical groups, another level is for defining rules for mapping user authentication information into the user account, and a third level is for defining policy rules for mapping users and user groups into principals.

The intermediate monitoring device 20 comprises appropriate interface apparatus for communication with the various other entities. In FIG. 1 example interface 22 is for communications with the user device 11. When the user 10 initiates access, using his user terminal device 11, to the host 30, instead of accessing directly the target host, the user access first the intermediate device 20. The access to the device 20 can be handled by a client 12 provided at the user device 11 and configured to communicate with a client or server 21 provided at the intermediate device 20. In the shown example the intermediate apparatus 20 comprises an SSH client 21 for secure communications with the user device 11, more particularly with a SSH client 12 provided in the user device. Non-modified secure shell (SSH) clients can be used at the user device 11 and/or the intermediate apparatus 20 for this purpose.

The intermediate device 20 can receive a request for access 100 from the device via the interface connected to the data processing apparatus 28. The request for access may contain at least one second authenticator for use in the authentication by the device of the request for access. Communications 106 between the intermediate device 20 and the host can be handled via interface 23. The communications can be based on an authenticator obtained from the security device 25. Interface 24 can be provided for communications with the security device 25. The intermediate device 20 can sent a request 102 and receive in response 104 an authenticator 40 from the security device via interface 24.

It shall be appreciated that the separate interfaces are shown for clarity, and denote logical interfaces. The interface apparatus may comprise a different number of physical connections from that shown, or just one physical connection. Furthermore, the security device may be provide within the intermediate node or as a therein integrated component, and thus the interface between the intermediate device 20 and the security device may be an internal interface within device 20.

The request for an authenticator may be sent to the security device after the request for access has been authenticated by the intermediate device based on the at least one second authenticator. The user can be authenticated by the intermediate device based on any appropriate authenticator. The authenticators can comprise keys, for example public and private key pairs on accordance with a PKI arrangement. A key manager device may be provided for centralised management of keys. For example, a universal key manager server may be provided. A key manager generates, distributes and manages keys for devices and applications of a data network system. For example, a key manager can create keys and provide each host in the system with a set of asymmetric keys.

A SSH agent 27 for communication towards the security device 25 may also be provided in some examples. The SSH 27 agent can be configured to implement a SSH agent protocol, communicate e.g. with the CA, obtain user authentication information, and take care of the user authentication authenticators, for example keypairs.

The intermediate device 20 terminates the SSH session of the user and may authenticate the user based on an auditor policy. The intermediate device can embed a CA client functionality and use the CA client to sign the public key of the user with the CA. The CA can verify the user authentication information with the system of record. CA can also resolve the user principals with the system of record. CA creates the certificate containing the user public key and other attributes, for example the principals, and signs the resulting certificate with its private key. Crypto auditor device uses the certificate in the SSH authentication together with the corresponding private key.

The target server then verifies the certificate of the user. The target server verifies that the user principals can be used to log in to the requested system account.

This aspect provides monitoring and control to connections established using an authenticators, e.g. a certificate where it is possible to set additional conditions on the use of the authenticators. For example, the aspect enables control of session length and prevents/reduces the possibility of a session that has been created using a valid certificate being hijacked and used for malicious purposes. Also, the aspect can reduce the number of keys needed.

Figure 3:
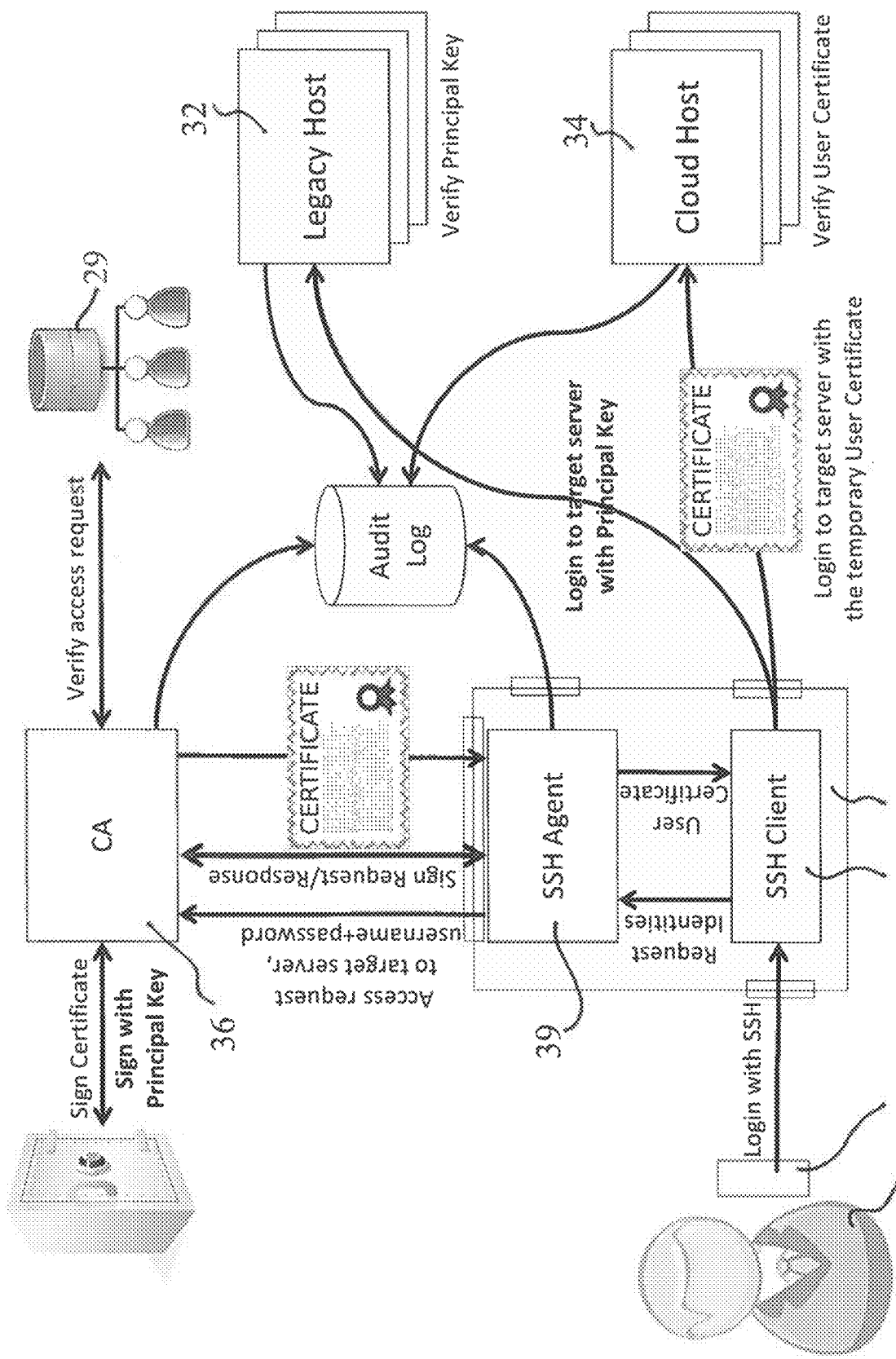
FIG. 3 illustrates another aspect.

In the following another aspect for accessing host in a hybrid computer network environment is described with reference to FIGS. 3 and 4. It is noted that in FIG. 3 several elements may be similar to those of FIG. 1, and therefore those are not described in detail here.

A hybrid environment may comprise at least a first type of hosts 32 and a second type of hosts 34. Because of this different logging credentials may be needed for a user 10 to be able to access a target host. An operation that is transparent for the user can be provided by an intermediate apparatus 38 configured to determine the type of the target host the user wants to access and the authenticator(s) needed for access to the target host. The intermediate apparatus can obtain, as appropriate, authenticators from a security device 36. The correspondence with and/or determination can be provided by an agent 39 comprised in the intermediate apparatus 38.

The intermediate apparatus comprises at least one processor, and a memory storing instructions that, when executed, cause the apparatus to be capable of performing the appropriate operations. These include adapting for reception of requests from users for access to hosts, obtaining authenticators for accessing the hosts, determining the type of the hosts, and processing the requests for access. The processing comprises determination resulting the intermediate apparatus to use a first type of authenticator for access to the first type of hosts and a second type of authenticators for access to the second type of hosts.

The intermediate apparatus may selectively request for an authenticator from a security device depending on the determined type of the host. In this case the determination of the type is performed before requesting for an authenticator. Alternatively, the intermediate apparatus may send the host an authenticator basket comprising different types of authenticators. The host can then select one or more authenticators it is adapted to use.

A possibility is that the intermediate has obtained authenticators for the different types of hosts, and determines whether to use an authenticator it has already received from a security device depending on the determined type of the host.

The first type of hosts may comprise legacy hosts and the second type of hosts may comprise cloud hosts. The apparatus may be configured to determine whether the target host is a legacy host or a cloud host. The legacy target hosts do not necessarily support certificate based authentication, or the legacy hosts are not configured to use certificates. Instead, the legacy hosts may operate based on e.g. principal key pairs. For example, "authorized_keys" files of target accounts can have been populated with the public keys of the corresponding "Principal Keypairs". The population can be done e.g. in the host provisioning phase. A possibility is to perform the population dynamically using a key management system such as the SSH Universal Key Manager UKM®. The intermediate apparatus can be configured to determine whether the certificate or principal keys based access shall be used. According to an aspect the apparatus is configured to, in response to a request for access to a host, determine the type of the host, and request for a certificate in response to determining that the host is a cloud host, and to use the principal keypairs in response to determining that the host is a legacy host.

Figure 4:
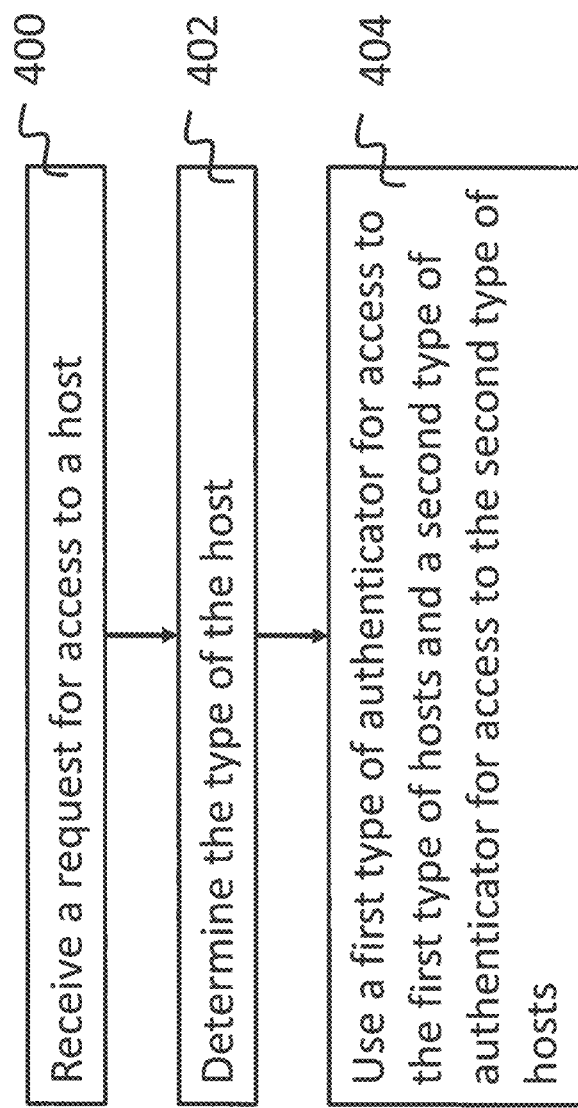
FIG. 4 shows a flowchart in accordance with an embodiment.

FIG. 4 shows a flowchart for a method for hybrid computer network environment comprising first type of hosts and a second type of hosts. In the method a request for access to a host is received at 400. The type of the host is determined at 402. The request for access is then processed at 404 using a first type of authenticator for access to the first type of hosts and a second type of authenticator for access to the second type of hosts.

An appropriate authenticator can be obtained before, simultaneously or after the determination of the type of the host.

FIGS. 5a, 5b, and 5c show different possibilities for implementing a method for accessing hosts in a hybrid computer network. According to FIG. 5a, an agent, after having received an access request from a client, determines at 50 the type of authenticator that is used by a host the client requests to access. Having determined the type of authenticator, the agent sends message 51 to a CA as a request of an authenticator of the determined type. The CA responses by 52 with an authenticator of the determined type. The agent then uses at message 53 this authenticator to provide the client with access the host. This type of operation has an advantage in that no changes to the host are needed. Also, processing at the CA can be kept optimally simple.

In the possibility shown in FIG. 5b, an agent sends a CA at message 54 a request to send multiple authenticators of different types. These can preferably be of all types supported by the CA for the client or the agent. The CA returns at message 55 the agent a list of authenticators of different types. The agent then selects at 56 the type of the authenticator to be used for accessing the specific host, and accesses at 57 the host using the selected authenticator. This way of operation has an advantage of not requiring any changes at the hosts, while enabling access to multiple hosts of different types with one request.

FIG. 5c shows operation where an agent sends a CA a request at 58 to send multiple authenticators of different types. The request can preferably be for authenticators of all types supported by the CA for the client or the agent. The CA returns by message 59 the agent a list of authenticators of different types. The agent then sends at the host an access request 60 using the multiple authenticators it received from the CA. The agents can provide all the authenticators it received from the CA to the hosts. The host receives the access request 60 comprising multiple authenticators, and selects at 61 an appropriate authenticator to be used for processing of the request. The hoist can then complete the authentication process using the selected authenticator.

In accordance with a more specific aspect the certificate based authentication flow works the same way as explained above with reference to FIGS. 1 and 2. A difference between this example and FIG. 1 is in the way security device, or the CA 36 is configured. In accordance with a possibility the CA has "Principal Keypairs" for all principals which contain legacy target hosts as the legacy target hosts do not support certificate based authentication or they are not configured to use it. When the user sends a request for access into a target host (this can be a legacy host or a cloud host), the request can include an indication that the CA shall sign the public key of the user device and return a certificate. The CA can check the user authentication and add user's principals to the resulting certificate.

The CA returns the public keys of all applicable Principal Keys in the certificate response. The SSH handshake then continues with identities: {Certificate(principal1, principal2 . . . ), PrincipalKey1, PrincipalKey2 . . . }. Based on the target host's configuration, the target host request sign operation with one of the private keys (certificate or principal key). If the target host is a cloud host, an agent 39 at the intermediate apparatus 38 has the private key matching the certificate's public key. If the target host is a legacy host, the agent delegates the sign request to the CA, which verifies the user authorization with the System of Record and signs the operation if user authorization is still valid. The certificate can be, for example, a certificate in accordance to X.509 standard, or any other certificate standard.

Figure 6:
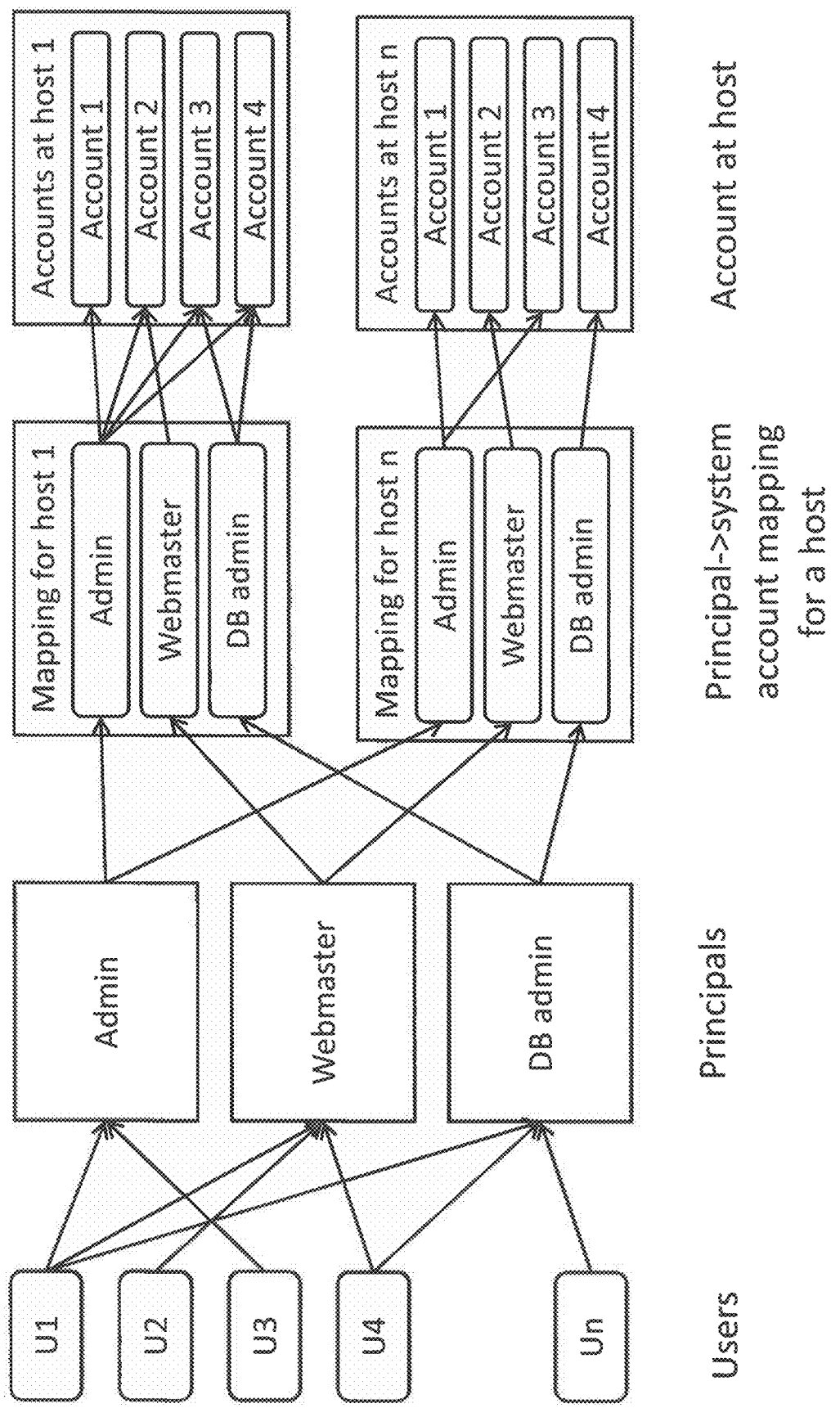
FIG. 6 illustrates an example relating to the concept of principals.
Figure 7:
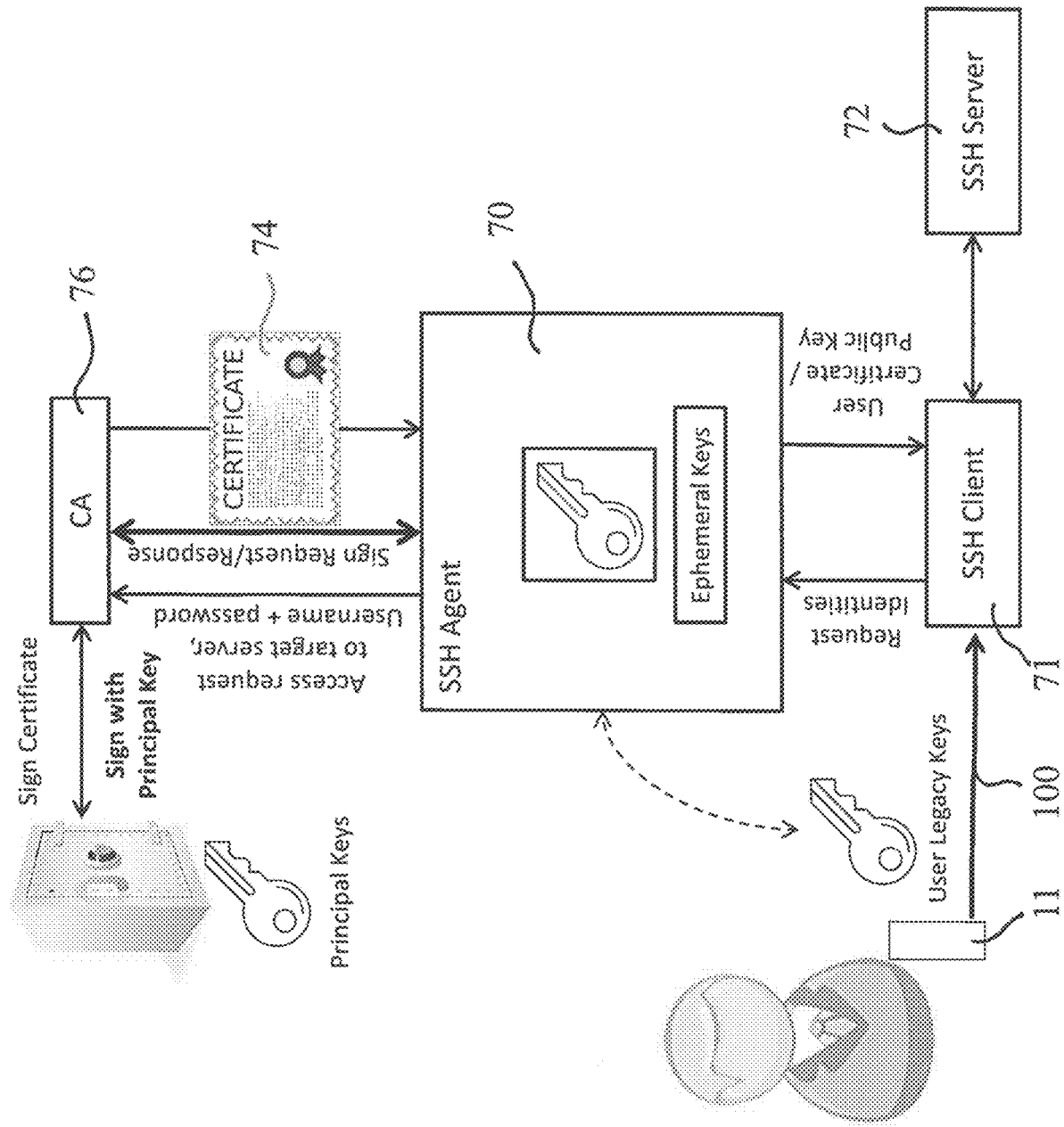
FIGS. 7-10 illustrate yet another aspect.

Target host configurations can be done with "users" and "principals". Cloud hosts can be configured with "authorized principals" mapping. This maps certificate's principals into local accounts on the host. Legacy hosts' local accounts can be configured to accept the Principal Keys' public keys in the accounts' authorized_keys files. An example of the roles of users and principals is illustrated by FIG. 6.

In this example users U1 to Un are mapped to principals defining the user roles. In this example the user roles are Administrator, Webmaster and Database administrator. For each host, these principals are mapped to accounts, which refine the access rights to different management actions, directories and file on that host. This simplifies the mapping of users to rights they have with different hosts, as each user is only mapped to a relatively low number of principals, and only the mapping of the relatively low number of principals to different accounts at the host is needed. Further, mapping of users to principals can be a mapping that is primarily based on human resource information. Mapping of principals to accounts in turn can be a mapping that primarily based on information held by the IT department. This enables each mapping to be done by organization having best set of information for that specific mapping available.

The logical policy configuration in the System of Record and CA can operate purely on the basis of "users" and "principals".

From the users' perspective the login flow is identical for both legacy and cloud hosts. The agent performs proxy key operations in case of a legacy host to provide the user authentication.

In case of auditing is desired, both host types provide similar audit trail from user to CA to target host.

The arrangement has an advantage in that the amount of keys that need to be maintained can be significantly reduced. The authenticators for the cloud type hosts can be set to have a relatively short validity period, and therefore will expire shortly after being used for the access, and before they would be found by scanning. This has advantage in particular in cloud environment where new virtual hosts, or servers, are constantly created and deleted.

The next describes an aspect relating to an agent for providing secure access with reference to FIGS. 7-10. An agent functionality 70 can be implemented at an intermediate apparatus. The agent is configured to, in response to receiving, from user device 11, a connection request 100 to a host 72, create an ephemeral keypair, or another authenticator. The agents may also retrieve the ephemeral authenticator from its memory, for example volatile memory. The connection request may be communicated between SSH entities at the user device and the apparatus, as described above. The SSH client 71 can be provided either on the network side, for example in an intermediate apparatus as described above, or in the user device 11, depending on the system configuration.

The agent 70 uses the created ephemeral keypair to acquire a certificate which has a limited lifetime using at least part of the ephemeral keypair. The certificate may also be based on more permanent authenticators. The acquired certificate 74 is then used for authentication to the host 72. The more permanent authenticators can be any authenticators provided by the authenticator authority.

An ephemeral keypair, or another ephemeral authenticator, can be created such that it can be used only once, or it can have a relatively short validity period. Another condition can be that it can only be used for the lifetime of the associated certificate. It may also be defined that the ephemeral keypair cannot be stored on non-volatile memory. Thus an agent may create in-memory ephemeral keys which are used only once for one authentication operation, or for limited time (e.g. all authentication operations during a five minute window), or the lifetime of a SSH agent.

If the SSH client is implemented on the user device, an agent can optionally read legacy keys of a user from a home directory of the user.

Figure 8:
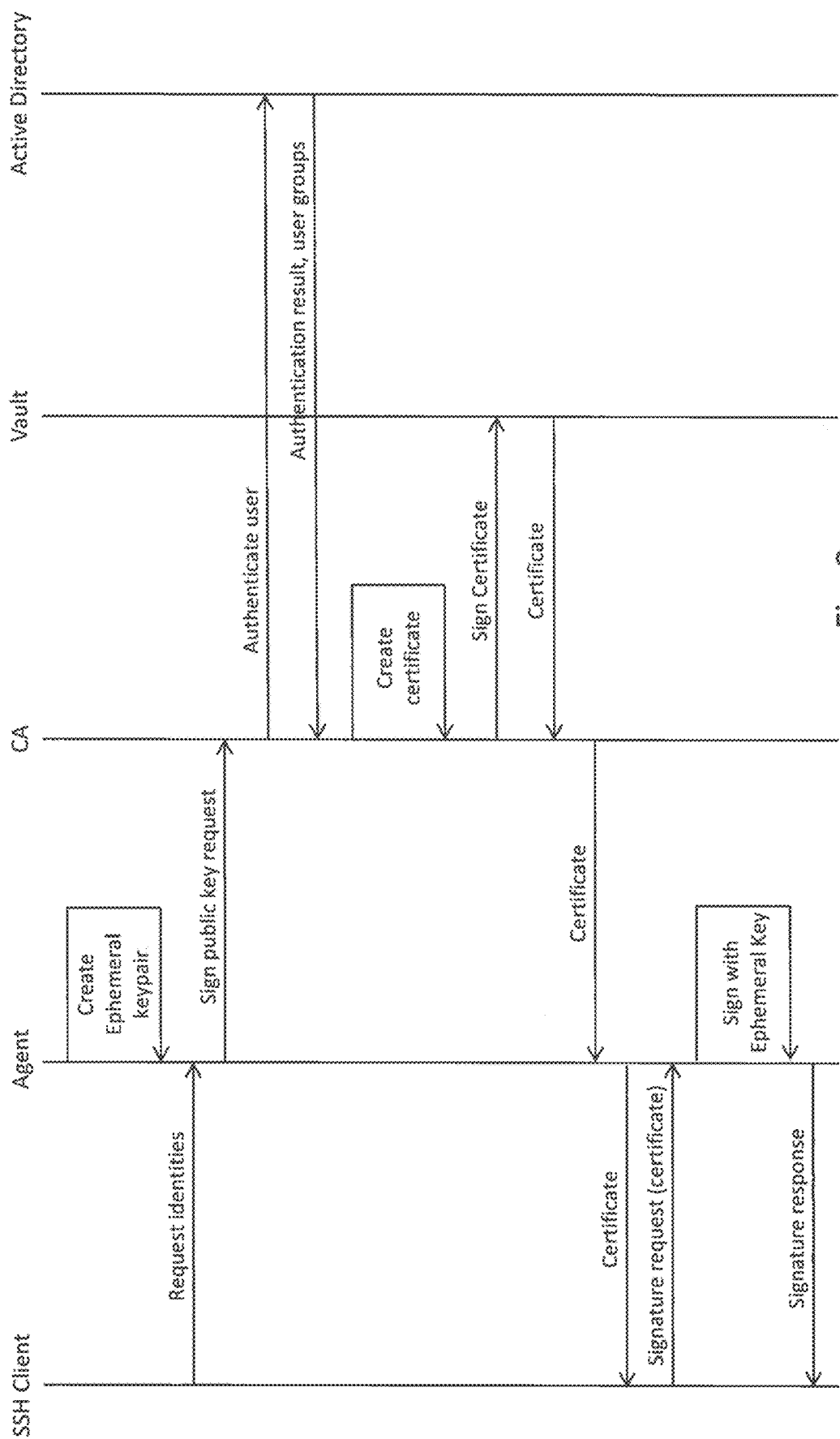

FIG. 8 shows a signalling flow between a client, an agent and a CA and components associated with the CA for a scenario where only one type of authenticators are needed. A client, in this example an SSH client, requests identities from an agent. The agent can have created beforehand, or creates at this stage, an ephemeral keypair.

The agent sends a request to a CA for signing of a public key request. The CA authenticates the user by exchanging appropriate message with an active directory.

After the user has been authenticated the CA can create a certificate. The certificate is signed with a vault. The signed certificate can then be forwarded from the CA to the agent. The agent can then forward the certificate to the SSH client. The certificate is now ready for use.

The client can request for signing of the challenge to confirm possession of the private key corresponding to the certificate. Upon receipt of the request to sign a challenge, the agent can sign the challenge with an ephemeral key corresponding with the certificate and respond to the request with the signature response.

Figure 9:
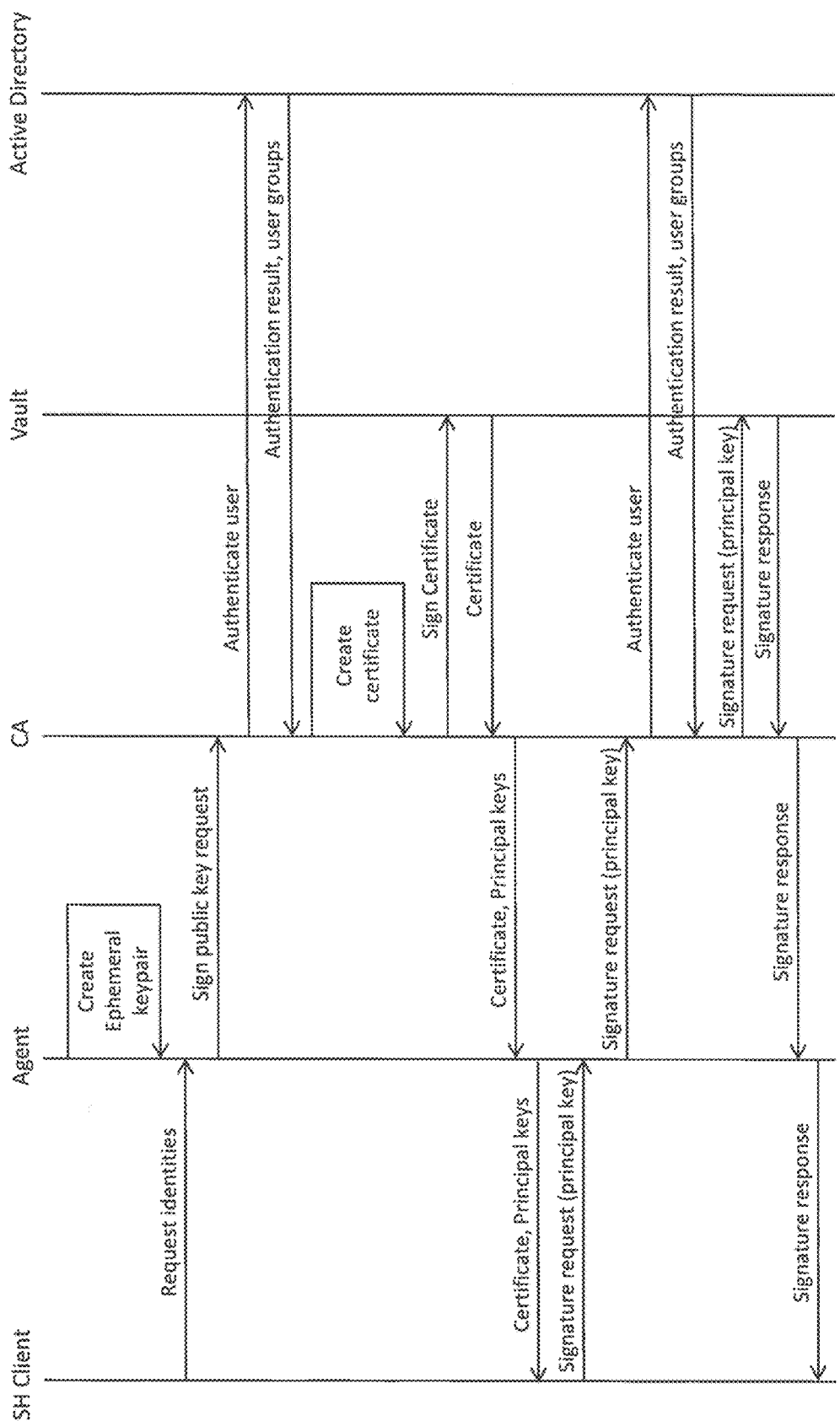

FIG. 9 shows signalling for a hybrid mode. In this case the keys are stored in a HSM/Vault of a CA, and the private key is never seen by users.

As above, a client first requests identities from the agent. The agent sends a request to a CA for signing of a public key request. The CA authenticates the user by exchanging appropriate message with an active directory. After the user has been authenticated the CA can create a certificate. The certificate is signed with a vault.

At this stage the CA can return the signed certificate and principal keys to the agent. The agent can then forward the certificate and the principal keys to the client.

The client can request for signing of the principal keys. Upon receipt of the request the CA can authenticate the user with the active directory and thereafter request for signing of the principal keys from the vault. Response to the signature request is forwarded from the CA to the agents and further to the client.

The client can selectively use either the certificate or the principal keys. Alternatively, the client can use both the certificate and the principal keys when authenticating to the host, and the host selects the appropriate authentication mechanism and key.

Figure 10:
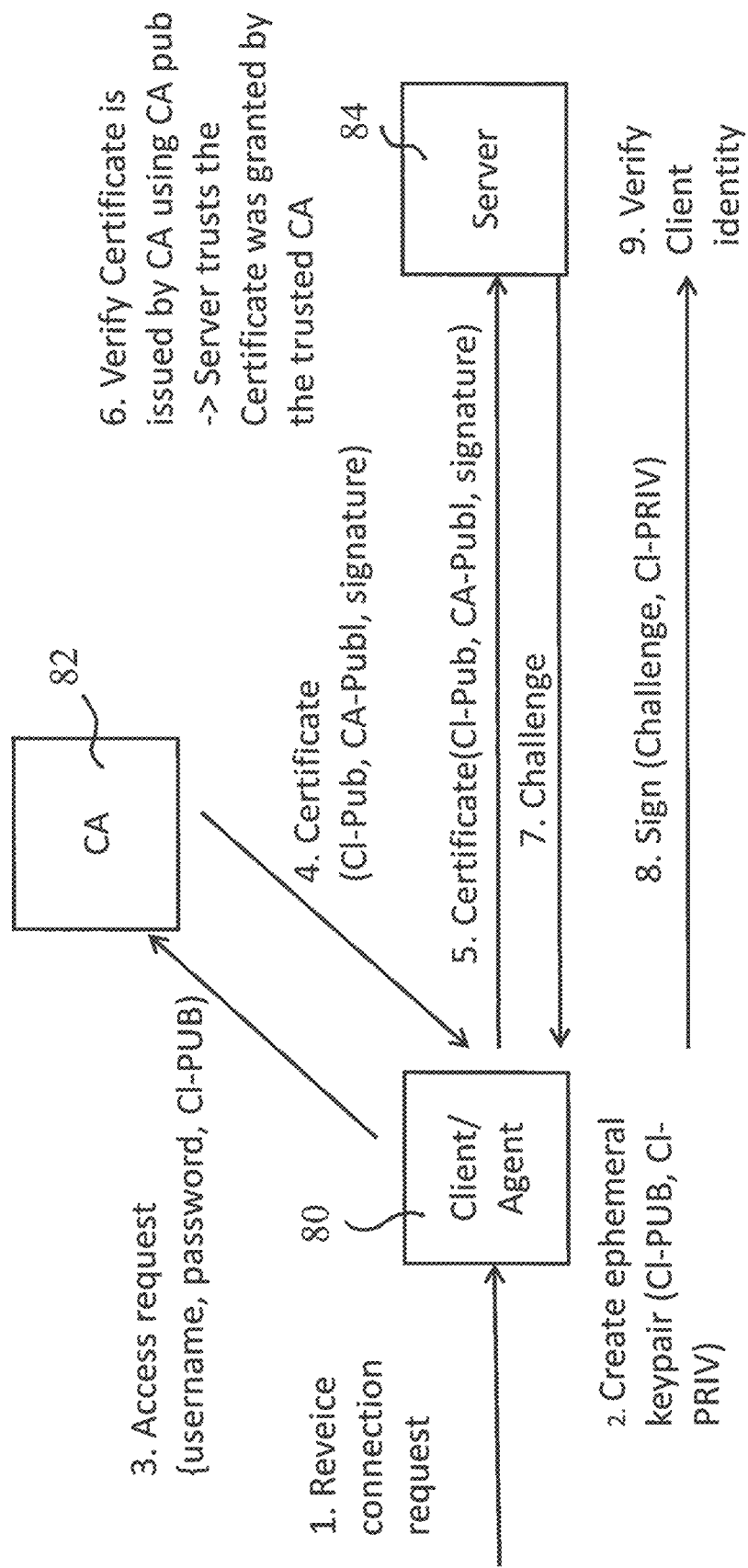

FIG. 10 shows signalling logic between various entities in accordance with an embodiment. A connection request to a host server 84 is received by a client 80 in message 1. The client creates ephemeral keypair at stage 2. The key pair can be e.g. {CI-PUB, CI-PRIV}. Access request 3 with username, password, and CI-PUB in then sent to a certificate authority (CA) 82. CA then returns by message 4 a certificate with CI-Pub, CA-Publ, and signature. The client 80 then uses the certificate when sending message 5 to the host server 84. At stage 6 the host server verifies that the certificate is issued by the CA using CA pub. After positive verification the server can trust that the certificate was granted by the trusted CA 82. In return a challenge 7 is sent to the client 80. The client respond the challenge by signing it with CI-PRIV. At stage 9 the host server 84 can verify the identity of the client.

Figure 11:
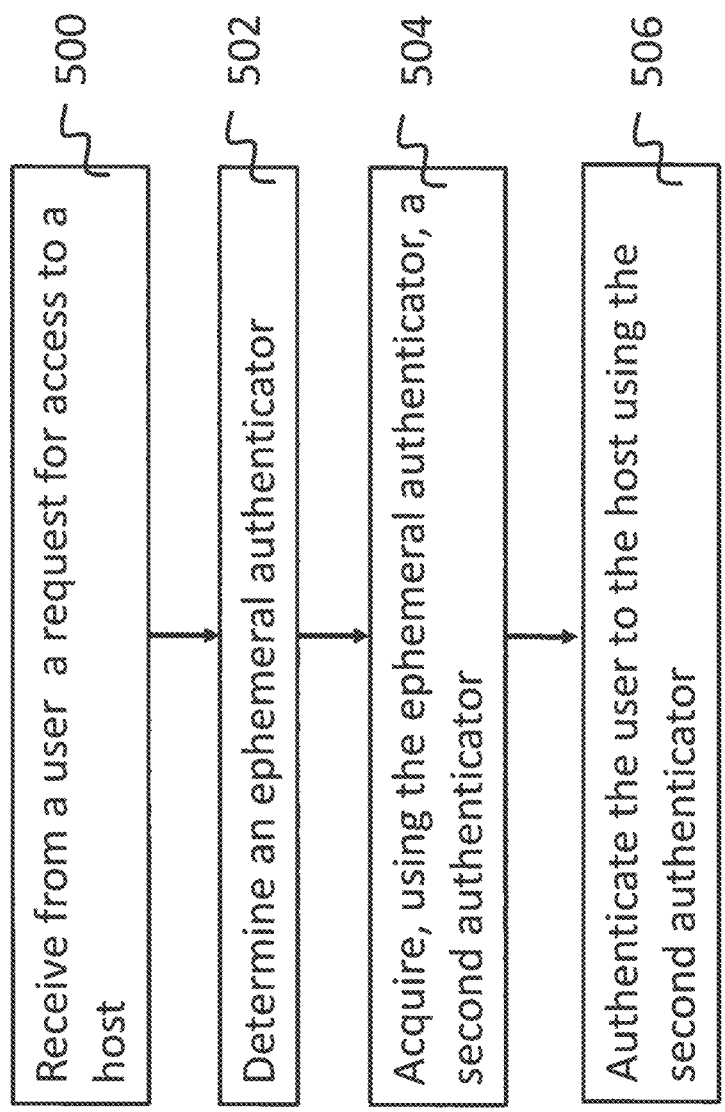
FIG. 11 shows a flowchart in accordance with the yet another aspect.

FIG. 11 is a flowchart illustrating operation of an agent entity for authenticating a user to a host. In the method the agent entity receives from the user a connection request to the host at 500, and in response thereto determines at 502 an ephemeral authenticator. The determination may comprise the agent entity creating an ephemeral authenticator. A possibility is that the agent stores ephemeral authenticators in a memory thereof, e.g. a volatile memory, and the step of determining comprises retrieving the ephemeral authenticator from the memory. The agent entity may then acquire, using the ephemeral authenticator, at 504 a second authenticator. The second authenticator can be generated by an external authenticator authority such that its use is based at least in part on the ephemeral authenticator. The second authenticator may be based e.g. on use of an ephemeral keypair and at least one more permanent authenticator. The agent can then authenticate at 506 the user to the host using the second authenticator.

The received second authenticator may comprises a certificate. The ephemeral authenticator may comprise a public key. The received certificate may then include at least part of the public key part of the ephemeral authenticator.

The lifetime of second authenticator may be restricted, e.g. as discussed above.

In this aspect it is possible to reduce, or even avoid altogether, the need to use keys for securing access and communications with the host server. Reduction in number of keys can make the management of keys easier. This can be especially the case in a cloud environment. Keys used by the user can be converted into a certificate. The certificate can have various conditions set upon it limiting its use. For example, the certificate can have a limited life-time, as limited number of times it can be used and limited uses.

FIG. 12 shows an example of control apparatus for providing necessary data processing functions to implement the above described embodiments. The control apparatus 90 can be for example integrated with, coupled to and/or otherwise arranged for controlling the intermediate data security apparatus 20 of FIG. 1, 38 of FIG. 3 or implementing any of the agents in FIGS. 1, 3, 5 and 7 to 10. The control apparatus 90 can be further arranged to provide control on communication sessions, authenticators and any additional information. In addition to the monitoring functions, the control apparatus can be configured to provide control functions in association with operations such as authentications with requesting devices, security devices, and hosts, decryption of data, signalling and data communication operations. A control apparatus can determine which key(s) or other authenticators are needed by an intermediate apparatus for the access and other control operations. For these purposes the control apparatus comprises at least one memory 91, at least one data processing unit 92, 93 and at least one input/output interface 94. Via the interface the control apparatus can be coupled to other entities of the respective device. The control apparatus can be configured to execute an appropriate software code to provide the control functions. The control apparatus can also be interconnected with other control entities. Means for providing an intermediate security function in a computerized network between hosts and devices capable of accessing the hosts can comprise an appropriate data processing and interface arrangement.

According to an aspect an intermediate apparatus can comprise interface means configured for communications with hosts and devices requesting access to the hosts such that the intermediate apparatus provides an intermediate security function between the hosts and the devices, and control means configured to process a request from a device for access to a host, obtain, from a security device, at least one authenticator for use in the requested access, and monitor communications that use the at least one authenticator.

According to another aspect control means are provided for a hybrid computer network environment, the environment comprising first type of hosts and a second type of hosts, where the means are configured to cause the apparatus to process received requests for access to hosts, obtain authenticators for accessing the hosts, determine the type of the hosts, and process the requests for access using a first type of authenticator for access to the first type of hosts and a second type of authenticators for access to the second type of hosts.

According to an aspect control means provide an agent function arranged to, in response to receiving a connection request, determine an ephemeral authenticator, use the ephemeral authenticator to acquire a second authenticator, wherein the second authenticator is based at least in part on use of the ephemeral authenticator, and perform authentication with a host using the second authenticator. The second authenticator in this aspect may also be requested from an external security device such as a CA. The control means may be provided in a network element or a user device.

The control means may further comprise an authentication component configured to authenticate the request for access to the host prior to sending a request for an authenticator to the security device.

The control means may further be configured to receive and authenticate requests for access from an access requesting device, wherein the request for access contains at least one second authenticator for use in the authentication of the request for access, request and receive the at least one authenticator from the security device after the request for access has been authenticated based on the at least one second authenticator, and process communications between the device and the host based on the at least one authenticator from the security device.

The control means may also be configured to monitor communications based on at least one condition for the use of the at least one authenticator. The control means may set at least one condition for the use of the at least one authenticator independently of the security device. The control means can receive information of at least one condition for the use of the at least one authenticator from the security device. The condition may comprise a validity period of an authenticator. The validity period can be set to be shorter than a validity period of a second authenticator for authentication of the request for access received from the device. The control means may monitor for expiry of a validity period of the authenticator that is shorter than a validity period of an authenticator received from the security device, a validity period of a second authenticator used for authentication of the request for access received from the device, maximum session length defined in association with the host, and/or maximum session length defined in association with the device.

The control means may be configured to monitor, at least, usage of the at least one authenticator, user of the at least one authenticator, behavior of the device, events associated with the host, events associated with one or more communication sessions established based on the at least one authenticator, and/or how and/or when the at least one authenticator is used.

The control means can be further configured to take a control action based on the monitoring. For example, the control means can be arranged to request for a new authenticator for the device, trigger an alert, prevent access by the device to the host, prevent access by the device to at least one other host, limit access by the device to the host or to at least one other host, and/or control the length of a communication session established based on the at least one authenticator.

The control means can be comprised in an intermediate device configured to intercept encrypted communications between the device and hosts. The intermediate device may provide at least some functionalities of a data auditing system.

The control means may be configured to selectively request for an authenticator from a security device depending on the determined type of the host. The control means may determine whether to use at least one authenticator received from a security device depending on the determined type of the host. The control means may select one authenticator from a plurality of authenticators, or send several, or all, authenticators received from a security device to one or more hosts. The control means may, in response to a request for access to a host, determine the type of the host, use a certificate in response to determining that the host is a cloud host and use principal keypairs in response to determining that the host is a legacy host.

An intermediate apparatus may comprise interface means for enabling communications with a security device, hosts and devices requesting for access to the hosts. The apparatus may comprise a first interface means for communicating with a user device, wherein access requests with second authenticators for authentication of the access requests can be received from the user device via the first interface means, second interface means for requesting an authenticator from the security device, and third interface means for communicating with the hosts.

The control means may create and/or retrieve an ephemeral authenticator. Memory means for storing ephemeral authenticators may also be provided. The control means may retrieve an ephemeral authenticator from the memory means in response to receiving an access request.

An ephemeral authenticator may comprise a public key. A certificate or another authenticator created in response to an ephemeral authenticator may include at least part of the public key part of the ephemeral authenticator. The authenticator may be based on use of an ephemeral keypair and at least one more permanent authenticator.

The various embodiments and their combinations or subdivisions may be implemented as methods, apparatuses, or computer program products. According to an aspect at least dome of the functionalities are provided in virtualised environment. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. At least some of the processing and/or hosts can be provided in virtualised environment.

A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in various combinations in, as non-limiting examples, hardware, software, firmware, special purpose circuits or logic, general purpose hardware or controller or other computing devices, or some combination thereof.

A centralized and scalable access management solution may be provided for elastic cloud environments. Access right updates ca be made instantaneously. Per-host changes may not be required. Certain aspects support both interactive and non-interactive (machine-to-machine) connections.

A Proxy, or a CA Proxy service, can also be provided in certain applications. The CA proxy runs at the target hosts. The proxy can be used in the "On-Demand Server-Based Authentication" use-case to cache the users' public keys and to manage the CA communication. Used in the "On-Demand User Provisioning" use-case to manage the CA communication.

NSS (Name Service Switch) Service provides network user information for target hosts in certain embodiments. The NSS service implements the "On-Demand User Provisioning" together with the standard "pam_mkhomedir" PAM module. Ordain NSS Service and PAM module provide on-demand user provisioning to Target Hosts In some scenarios SSO Agent may also be provided. The SSO agent can be used to implement non-interactive single sign-on functionality, run on non-user privileges, and have a trust relationship with a certificate authority (CA) based on, for example, a shared secret to provide user authentication information.

According to a possibility different configurations of an intercepting auditor apparatus can be used. These may include bastion mode, router mode, and bridge mode. An auditor device may embed a CA Client (SSH Agent) functionality so it will see the issued user certificates. The user certificate can be annotated with SSH specific extensions so that CA and Crypto Auditor can enforce more fine-grained policy. For example, Crypto Auditor can terminate the user's SSH sessions after the authentication certificate expires. Also, a certificate can describe on protocol and port number level which SSH port forwarding options are allowed. Certificate can describe detailed session auditing parameters which are implemented by the Crypto Auditor packet processing engine.

The various aspects and features discussed above can be combined in manners not specifically shown by the drawings and/or described above.

The foregoing description provides by way of exemplary and non-limiting examples a full and informative description of exemplary embodiments and aspects of the invention. However, various modifications and adaptations falling within the spirit and scope of this disclosure may become apparent to those skilled in the relevant arts in view of the foregoing description, when read in conjunction with the accompanying drawings and the appended claims.

I claim:

1. An intermediate device for providing a security function in a computerized network between hosts and devices capable of accessing the hosts, the intermediate device comprising:
an interface apparatus configured for communications with hosts and devices requesting access to the hosts such that the intermediate device provides an intermediate node between the hosts and the devices, and
a control apparatus connected to the interface apparatus and comprising at least one processor, and memory storing instructions that, when executed, cause the control apparatus to:
process a request, received by the intermediate device and from a device, for access to a host,
request and receive, by the intermediate device and from a security device, at least one ephemeral authenticator based on a user role mapped from the request received by the intermediate device and from the device for use in the requested access to the host, and
monitor and process communications between the device and the host through the intermediate device that use the at least one ephemeral authenticator to identify a user of the at least one ephemeral authenticator for the communications between the device and the host,
wherein the monitoring is based on at least one condition on use of the at least one ephemeral authenticator.

2. The intermediate device according to claim 1, wherein the at least one ephemeral authenticator comprises a certificate.

3. The intermediate device according to claim 2, wherein the control apparatus is configured to request for the certificate from a certificate authority (CA).

4. The intermediate device according to claim 1, the control apparatus comprising an authentication component configured to authenticate the request for the access to the host prior to sending a request for an authenticator to the security device.

5. An intermediate device for providing a security function in a computerized network between hosts and devices capable of accessing the hosts, the intermediate device comprising:
  an interface apparatus configured for communications with hosts and devices requesting access to the hosts such that the intermediate device provides an intermediate node between the hosts and the devices, and
  a control apparatus connected to the interface apparatus and comprising at least one processor, and memory storing instructions that, when executed, cause the control apparatus to:
    receive, from a device, and authenticate a request for access to a host, wherein the request for access contains at least one second authenticator for use in authentication of the request for access;
    after the request for access has been authenticated based on the at least one second authenticator, request and receive, from a security device, at least one ephemeral authenticator based on a user role mapped from the request received by the intermediate device and from the device for use in the requested access to the host; and
    process communications between the device and the host that use the at least one ephemeral authenticator from the security device to identify a user of the at least one ephemeral authenticator for the communications between the device and the host,
  wherein the control apparatus is configured to monitor, based on at least one condition for use of the at least one ephemeral authenticator, the communications between the device and the host.

6. The intermediate device according to claim 1, wherein the control apparatus is configured to set, independently of the security device, at least one condition for the use of the at least one ephemeral authenticator.

7. The intermediate device according to claim 1, wherein the control apparatus is configured to receive, from the security device, at least one condition for the use of the at least one ephemeral authenticator.

8. The intermediate device according to claim 1, wherein the at least one condition comprises a validity period.

9. The intermediate device according to claim 8, wherein the validity period is shorter than a validity period of a second authenticator for authentication of the request, received from the device, for the access to the host.

10. The intermediate device according to claim 8, wherein the control apparatus is configured to monitor for expiry of a validity period that is shorter than at least one of:
  a validity period of an ephemeral authenticator received from the security device,
  a validity period of a second authenticator used for authentication of the request, received from the device, for the access to the host,
  a maximum session length defined in association with the host, or
  a maximum session length defined in association with the device.

11. The intermediate device according to claim 1, wherein the control apparatus is configured to monitor at least one of:
  usage of the at least one ephemeral authenticator,
  a user of the at least one ephemeral authenticator,
  behavior of the device,
  events associated with the host,
  events associated with one or more communication sessions established based on the at least one ephemeral authenticator, or
  how and/or when the at least one ephemeral authenticator is used.

12. The intermediate device according to claim 1, wherein the control apparatus is further configured to take a control action based on the monitoring.

13. The intermediate device according to claim 10, wherein the control apparatus is further configured to at least one of:
  request for a new authenticator for the device,
  trigger an alert,
  prevent access by the device to the host,
  prevent access by the device to at least one other host,
  limit access by the device to the host or to at least one other host, or
  control a length of a communication session established based on the at least one ephemeral authenticator.

14. The intermediate device according to claim 1, configured to intercept encrypted communications between the device and hosts.

15. The intermediate device according to claim 14, configured to provide at least some functionalities of a data auditing system.

16. A method for providing a security function by an intermediate device located between hosts and devices requesting for access to the hosts in a computerized network, the method comprising:
  receiving, from a device and by the intermediate device, a request for access to a host,
  requesting and receiving, by the intermediate device and based on a user role mapped from the request received by the intermediate device and from the device, at least one ephemeral authenticator for use in the requested access to the host, and
  monitoring and processing, by the intermediate device, communications between the device and the host through the intermediate device that use the at least one ephemeral authenticator to identify a user of the at least one ephemeral authenticator for the communications between the device and the host,
  wherein the monitoring is based on at least one condition on use of the at least one ephemeral authenticator.

17. The method according to claim 16, wherein the requesting and receiving the at least one ephemeral authenticator comprises requesting and receiving, from an external security device, the at least one ephemeral authenticator.

18. The method according to claim 16, wherein the requesting and receiving the at least one ephemeral authenticator comprises sending, from the intermediate device and to a certificate authority, a request for a certificate and the monitoring comprises monitoring communications that use the certificate.

19. The method according to claim 16, comprising, prior to sending a request for the at least one ephemeral authenticator, authenticating, based on at least one second authenticator, the request for the access to the host.

20. The method according to claim 16, comprising at least one of:
  setting, by the intermediate device and independently of a security device from which the at least one ephemeral authenticator is obtained, at least one condition on the use of the at least one ephemeral authenticator, or
  receiving, from the security device, at least one condition on the use of the at least one ephemeral authenticator.

21. The method according to claim 16, wherein at least one ephemeral authenticator has a validity period that is shorter than at least one of:
- a validity period of a second authenticator used for authentication of the request, received from the device, for the access to the host,
- a validity period of at least one ephemeral authenticator set by and received from a security device,
- a maximum session length defined in association with the host, or
- a maximum session length defined in association with the device.

22. The method according to claim 16, comprising monitoring at least one of:
- usage of the at least one ephemeral authenticator,
- a user of the at least one ephemeral authenticator,
- behavior of the device,
- events associated with the host,
- events associated with one or more communication sessions established based on the at least one ephemeral authenticator, or
- how and/or when the at least one ephemeral authenticator is used.

23. The method according to claim 16, further comprising performing a control action based on the monitoring, the control action comprising at least one of:
- requesting for a new authenticator for the device,
- triggering an alert,
- preventing access by the device to the host,
- preventing access by the device to at least one other host,
- limiting access by the device to the host or to at least one other host, or
- controlling a length of a communication session established based on the at least one ephemeral authenticator.

24. The method according to claim 16, further comprising intercepting encrypted communications between the device and hosts and providing at least some functionalities of a data auditing system based on the intercepted encrypted communications.

25. A non-transitory computer readable media comprising program code for causing a processor to perform instructions for a security method implemented at an intermediate device located between hosts and devices requesting for access to the hosts in a computerized network, the security method performed by the intermediate device comprising:
- receiving, by the intermediate device and from a device, a request for access to a host,
- requesting and receiving, by the intermediate device and based on a user role mapped from the request received by the intermediate device and from the device, at least one ephemeral authenticator for use in the requested access to the host, and
- monitoring and processing communications between the device and the host through the intermediate device that use the at least one ephemeral authenticator to identify a user of the at least one ephemeral authenticator for the communications between the device and the host,
- wherein the monitoring is based on at least one condition on use of the at least one ephemeral authenticator.

26. The non-transitory computer readable media according to claim 25, causing the processor to perform instructions for requesting and receiving, from an external security device, the at least one ephemeral authenticator.

* * * * *